(No Model.)
C. C. RICHARDSON.
BICYCLE LANTERN HOLDER.
No. 306,284. Patented Oct. 7, 1884.
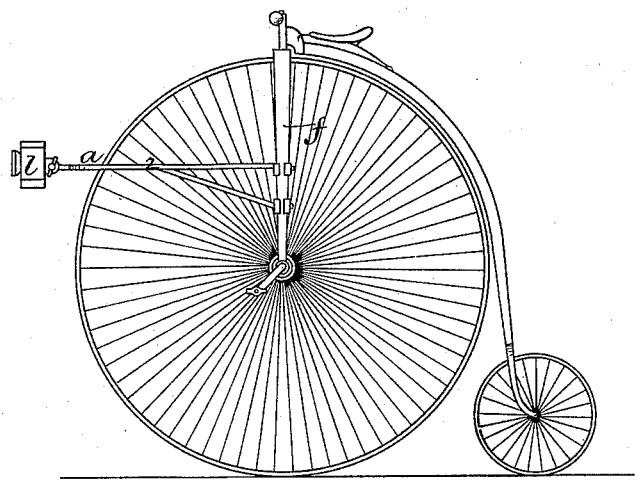
Fig. 1.
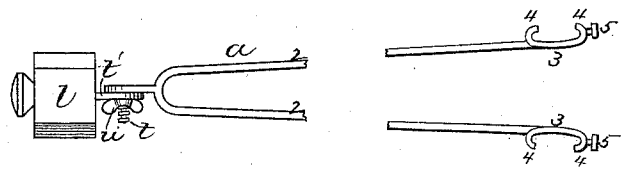
Fig. 2.
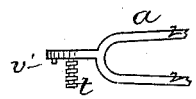   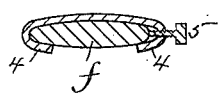   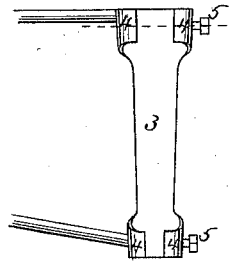
Fig. 3.   Fig. 6.
Fig. 4.   Fig. 5.
Witnesses.   Inventor.

UNITED STATES PATENT OFFICE.

CHESTER C. RICHARDSON, OF READING, MASSACHUSETTS.

BICYCLE LANTERN-HOLDER.

SPECIFICATION forming part of Letters Patent No. 306,284, dated October 7, 1884.

Application filed March 17, 1884. (No model.)

*To all whom it may concern:*

Be it known that I, CHESTER C. RICHARDSON, of Reading, in the county of Middlesex and State of Massachusetts, have invented certain Improvements in Bicycle Lantern-Holders, of which the following is a specification.

This invention has for its object to provide improved means for supporting a lantern on a bicycle so that the light can be thrown ahead of the machine without being obstructed by the wheel.

The invention has for its object also to enable the lantern to be adjusted and positively held at various angles, so that the light may be directed as may be desired.

To these ends my invention consists in the improvements which I will now proceed to describe and claim.

Of the accompanying drawings, forming a part of this specification, Figure 1 represents a side elevation of a bicycle provided with my improvement. Fig. 2 represents a top view of the device detached from the bicycle. Figs. 3, 4, 5, and 6 represent detail views.

The same letters of reference indicate the same parts in all the figures.

In carrying out my invention I provide a holder, *a*, adapted to be secured to the fork *f* or any suitable part of the frame of a bicycle. The holder is provided at its forward end with means for holding a lantern, *l*, and is of such length that when secured to the frame it will hold the lantern so far forward that its light will not be obstructed by the wheel at any point. The holder, as shown in this instance, is a forked bracket composed of two arms, 2 2, which are provided at their rear ends with plates 3 3, having lugs 4 4 and set-screws 5 5, adapted to grasp the arms or sides of the fork *f* of the machine. The arms of the fork are usually tapered or reduced in width downwardly, and the plates 3 3 are similarly formed, the spaces between the lugs being wider than the narrower lower ends of the arms of the fork, so that they can be placed on said arms and then moved upwardly until the inner sides of the lugs come to a bearing on the edges of the fork-arms, the set-screws 5 5 being then turned against the fork-arms *f f*. The arms 2 2 of the holder are preferably bifurcated where they are attached to the plates 3 3, the bifurcation bracing or supporting the holder against downward pressure.

It will be seen that the holder is adapted to be readily applied and removed, and by its forward projection locates the lantern where its light will be the most effective, and will not cast a shadow of the wheel at any point in advance of the bicycle.

I prefer to provide means whereby the lantern may be rigidly attached to the holder, and may be adjusted so that it will throw its light downwardly or in any desired forward direction. To this end the forward end of the holder is provided with a threaded bolt, *t*, and the back of the lantern with a lug, *t'*, perforated to receive the bolt. A thumb-nut, *u*, is screwed onto the bolt *t*, and clamps the lug *t'* against the end of the holder.

The lantern may be adjusted at any desired angle on the screw and then fixed by the thumb-nut. The lug *u* may be provided with a series of orifices, *v*, arranged as shown in Fig. 4, either one of which is adapted to receive a pin or stud, *v'*, affixed to the holder. The lantern may thus be held at various angles more positively than by the unaided pressure of the thumb-nut.

While the construction shown is the best of which I am at present aware, I do not limit myself to the details thereof, but reserve the right to variously modify the same. For example, the holder may be attached to the fork at a point above the wheel. The lantern may be secured to the holder by any other suitable means besides those described.

I claim—

1. A bicycle lantern-holder composed of an arm or bracket of suitable length to extend from the frame of the bicycle to the front of the wheel, and provided at its rear end with clamping devices, whereby it may be detachably connected to said frame, and at its forward end with means for holding a lantern detachably, as set forth.

2. A bicycle lantern-holder composed of an arm or bracket of suitable length to extend from the frame of the bicycle to the front of the wheel, and provided at its rear end with clamping devices, whereby it may be detachably connected to said frame, and at its forward end with means for positively holding a lantern at different angles, whereby the direction in which the light is thrown may be varied, as set forth.

3. The improved bicycle lantern-holder composed of the two-armed bracket having lug and threaded bolt at the front end thereof, and plates 3 3 at the rear ends thereof, adapted to be detachably secured to the arms of the fork, as set forth.

In testimony whereof I have signed my name to this specification, in the presence of two subscribing witnesses, this 14th day of March, 1884.

CHESTER C. RICHARDSON.

Witnesses:
A. S. RICHARDSON,
C. F. BROWN.